(12) United States Patent
Sung

(10) Patent No.: US 7,261,752 B2
(45) Date of Patent: Aug. 28, 2007

(54) MOLTEN BRAZE-COATED SUPERABRASIVE PARTICLES AND ASSOCIATED METHODS

(76) Inventor: Chien-Min Sung, 64 Chung-San Road, Taipei County (TW) 23911

( * ) Notice: Subject to any disclaimer, the term of this patent is extended or adjusted under 35 U.S.C. 154(b) by 316 days.

(21) Appl. No.: 10/627,441

(22) Filed: Jul. 25, 2003

(65) Prior Publication Data

US 2005/0230155 A1  Oct. 20, 2005

Related U.S. Application Data

(63) Continuation-in-part of application No. 10/254,057, filed on Sep. 24, 2002, now Pat. No. 6,830,598.

(51) Int. Cl.
*B24D 18/00* (2006.01)
*B05D 7/00* (2006.01)
*B05D 1/18* (2006.01)

(52) U.S. Cl. .............................. 51/293; 51/307; 51/308; 51/309; 427/217; 427/431; 427/389.1

(58) Field of Classification Search .................. 51/307, 51/308, 309, 293; 427/214, 217, 431, 443.2, 427/398.1; 228/101, 262.9
See application file for complete search history.

(56) References Cited

U.S. PATENT DOCUMENTS

| | | |
|---|---|---|
| 4,063,907 A | 12/1977 | Lee et al. |
| 4,239,502 A | 12/1980 | Slack et al. |
| 4,390,647 A | 6/1983 | Girgis |
| 4,620,933 A | 11/1986 | Ochiai et al. |
| 4,795,678 A | 1/1989 | Girgis |
| 4,968,326 A | 11/1990 | Wiand |
| 5,024,680 A | 6/1991 | Chen et al. |
| 5,030,276 A * | 7/1991 | Sung et al. .................. 75/237 |
| 5,038,555 A | 8/1991 | Wu et al. |
| 5,062,862 A | 11/1991 | Jansen |
| 5,096,465 A | 3/1992 | Chen et al. |
| 5,116,568 A | 5/1992 | Sung et al. |
| 5,230,718 A | 7/1993 | Oki et al. |
| 5,558,705 A | 9/1996 | Keemer et al. |
| 5,571,296 A | 11/1996 | Barber, Jr. et al. |
| 5,755,298 A | 5/1998 | Langford, Jr. et al. |
| 5,755,299 A | 5/1998 | Langford, Jr. et al. |
| 6,039,641 A | 3/2000 | Sung |
| 6,102,140 A | 8/2000 | Boyce et al. |
| 6,238,280 B1 | 5/2001 | Ritt et al. |
| 6,579,931 B1 | 6/2003 | Hall |

FOREIGN PATENT DOCUMENTS

| | | | |
|---|---|---|---|
| EP | 570635 | * | 11/1993 |
| WO | WO89/01843 | | 3/1989 |

* cited by examiner

*Primary Examiner*—Michael Marcheschi
(74) *Attorney, Agent, or Firm*—Thorpe North & Western LLP

(57) ABSTRACT

A superabrasive particle coated with a solidified coating of a molten braze alloy that is chemically bonded to the superabrasive particle is disclosed and described. In one aspect, the reactive metal alloy may be chemically bonded to at least about 80% of an outer surface of the superabrasive particle. Various methods for making and using such a coated superabrasive particle are additionally disclosed and described.

9 Claims, 3 Drawing Sheets

MOLTEN BRAZE-COATED SUPERABRASIVE PARTICLES AND ASSOCIATED METHODS

PRIORITY DATA

This application is a continuation-in-part of U.S. patent application Ser. No. 10/254,057, filed Sep. 24, 2002, now issued as U.S. Pat. No. 6,830,598, which is incorporated herein by reference.

FIELD OF THE INVENTION

The present invention relates to devices that incorporate superabrasive materials, and methods for the production and use thereof. Accordingly, the present invention involves the fields of chemistry, physics, and materials science.

BACKGROUND OF THE INVENTION

A variety of abrasive and superabrasive tools have been developed over the past century for performing the general function of removing material from a workpiece. Actions such as sawing, drilling, polishing, cleaning, carving, and grinding, are all examples of material removal processes that have become fundamental to a variety of industries.

A number of specific material removal applications require the use of superabrasive tools. In these cases, the use of conventional abrasive tools may be infeasible due to the nature of the workpiece, or the surrounding circumstances of the process. For example, activities such as cutting stone, tile, cement, etc, are often cost prohibitive, if not impossible to accomplish, when attempted using a conventional metal saw blade. Additionally, the economy and performance of other material removal activities may be increased when using superabrasive tools, due to their greater durability.

One common way in which superabrasive materials have been incorporated into a tool is as superabrasive particles. In this case, the superabrasive particles are most often embedded in a matrix, such as a metal matrix, and held in place by the mechanical forces created by the portion of the matrix directly surrounding the particles. A variety of consolidation techniques, such as electroplating, sintering, or hot pressing a matrix around superabrasive particles is known. However, because the matrix surrounding the superabrasive particles is softer than the superabrasive particles, it wears away more quickly during use, and leaves the diamond particles over-exposed, and unsupported. As a result, the diamond particles become prematurely dislodged and shorten the service life of the tool.

A number of attempts have been made to overcome the above-recited shortcoming. Most notably, several techniques that attempt to chemically bond the superabrasive particles to the matrix, or other substrate material, have been employed. The main focus of such techniques is to coat or otherwise contact the superabrasive particle with a reactive element that is capable of forming a carbide bond between the superabrasive particle and the metal matrix, such as titanium, chromium, tungsten, etc. Examples of specific processes include those disclosed in U.S. Pat. Nos. 3,650,714, 4,943,488, 5,024,680, and 5,030,276, each of which is incorporated herein by reference. However, such processes are difficult and costly for a variety of reasons, including the highly inert nature of most superabrasive particles, and the high melting point of most reactive materials.

Further, the melting point of most reactive metal materials is well above the stability threshold temperature of most superabrasives. To this end, the method by which the reactive material may be applied to the superabrasives is generally limited to either solid-state reactions or gas reactions that are carried out at a temperature that is sufficiently low so that damage to the diamond does not occur. Such processes are only capable of achieving a monolithic coating, and cannot produce an alloy coating. While the strength of the carbide bonds yielded using these techniques generally improves particle retention over mere mechanical bonds, they still allow superabrasive particles to become dislodged prematurely.

Another method of forming carbide bonds is by using a braze alloy that contains a reactive element. The braze alloy is consolidated around the superabrasive particles by sintering. One example of a specific process of this type is found in U.S. Pat. No. 6,238,280, which is incorporated herein by reference. While such processes may yield a tool that has greater grit retention than tools having no chemical bonding of the superabrasive particles, as a general matter, solid-state sintering of the braze alloy only consolidates the matrix material, and does not attain as much chemical bonding as the solid and gas state deposition techniques.

Additionally, the use of conventional braze may be limited, as it generally also serves as the matrix material for the body of the tool. Most braze alloys are ill equipped to act as a bonding medium and simultaneously act as the matrix material, due to the specific characteristics required by each of these elements during use. For example, in order to achieve greater carbide bonding, some superabrasive particles may require alloys that are too soft for the intended tool application. A matrix that is made of a material that is too soft may wear away too quickly and allow the superabrasive particles to dislodge prematurely.

As such, superabrasive tools that display improved superabrasive particle retention and wear characteristics, including methods for the production thereof, continue to be sought through ongoing research and development efforts.

SUMMARY OF THE INVENTION

Accordingly, the present invention provides superabrasive tools having improved superabrasive particle retention, and methods for the making thereof. As a basic component of such tools, the present invention additionally provides a coated superabrasive particle having improved retention properties when incorporated into a tool. As an additional component of such tools, the present invention additionally provides superabrasive tool precursors for incorporation into a tool. In one aspect, such precursors may consist essentially of at least one superabrasive particle coated with a solidified molten braze alloy. In another aspect, such a precursor may include a plurality of coated particles metallurgically bonded together by the braze alloy coatings. Such precursors may contain superabrasive particles in a random placement or configuration, but may also have superabrasive particles arranged and held in accordance with a predetermined pattern.

In addition to the above-enumerated components, the superabrasive tools of the present invention may include a support matrix that is metallurgically bonded to the coated superabrasive particles, or a tool precursor. Such a matrix may be made from a variety of materials, including consolidated metal powders and solid metal substrates. The choice may depend on a number of factors, including the specific type of tool being made and the performance requirements therefor. In one aspect, the support matrix may be porous. In another aspect, the coated superabrasive particles, or tool precursors may be metallurgically bonded to the support matrix such that the superabrasive particles substantially conform to a predetermined pattern.

In one specific embodiment, a superabrasive tool in accordance with the present invention may include a plurality of superabrasive particles coated with a solidified molten braze alloy and metallurgically bonded together by the braze coatings and also include a plurality of spacer particles chemically bonded to the molten braze alloy. Such a tool may contain either or both of the superabrasive particles in a random placement, or arranged in accordance with a predetermined pattern. Furthermore, the spacer particles may themselves be coated with a solidified molten braze alloy prior to incorporation into the tool, or may be uncoated.

The present invention additionally encompasses methods of making superabrasive precursors and tools as recited herein. In one aspect, a method for making a tool precursor may consist essentially of metallurgically bonding together a plurality of superabrasive particles, each coated with a solidified molten braze alloy. In another aspect, a method of making a superabrasive tool may include providing a tool precursor as recited herein, and metallurgically bonding the precursor to a support matrix.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

Figures 1A, 1B, 1C:
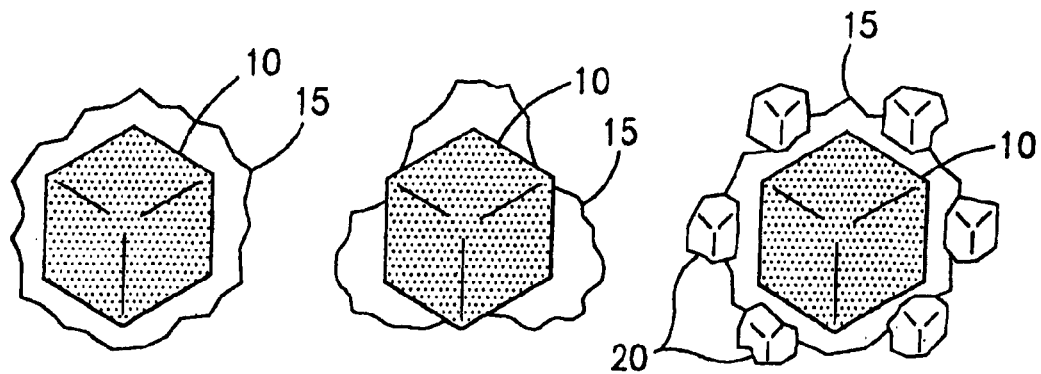
FIG. 1a is a side view of a coated superabrasive particle in accordance with one embodiment of the present invention.
FIG. 1b is a side view of a coated superabrasive particle in accordance with one embodiment of the present invention.
FIG. 1c is a side view of a coated superabrasive particle having superabrasive particles of a smaller size chemically bonded thereto in accordance with one embodiment of the present invention.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an" and "the" include plural referents unless the context clearly dictates otherwise. Thus, for example, reference to "a diamond particle" includes one or more of such particles, reference to "a carbon source" includes reference to one or more of such carbon sources, and reference to "a reactive material" includes reference to one or more of such materials.

Definitions

In describing and claiming the present invention, the following terminology will be used in accordance with the definitions set forth below.

As used herein, "super hard" and "superabrasive" may be used interchangeably, and refer to a crystalline, or polycrystalline material, or mixture of such materials having a Vicker's hardness of about 4000 Kg/mm$^2$ or greater. Such materials may include without limitation, diamond, and cubic boron nitride (cBN), as well as other materials known to those skilled in the art. While superabrasive materials are very inert and thus difficult to form chemical bonds with, it is known that certain reactive elements, such as chromium and titanium are capable of chemically reacting with superabrasive materials at certain temperatures.

As used herein, "metallic" refers to a metal, or an alloy of two or more metals. A wide variety of metallic materials is known to those skilled in the art, such as aluminum, copper, chromium, iron, steel, stainless steel, titanium, tungsten, zinc, zirconium, molybdenum, etc., including alloys and compounds thereof.

As used herein, "particle" and "grit" may be used interchangeably, and when used in connection with a superabrasive material, refer to a particulate form of such material. Such particles or grits may take a variety of shapes, including round, oblong, square, euhedral, etc., as well as a number of specific mesh sizes. As is known in the art, "mesh" refers to the number of holes per unit area as in the case of U.S. meshes.

As used herein, "support matrix" and "tool matrix" may be used interchangeably and refer to a material or substance that is capable of receiving abrasive elements, including tool precursors and precursor elements as recited herein, which is of a material that is different than that used for the molten braze alloy coating of the superabrasive particles. In some aspects, a support matrix may be a complete tool body, and in other aspects, a support matrix may be only a portion or segment of a tool body.

As used herein, "reactive element" and "reactive metal" may be used interchangeably, and refer to a metal element that can chemically react with and chemically bond to a superabrasive particle. Examples of reactive elements may include without limitation, transition metals such as titanium (Ti) and chromium (Cr), including refractory elements, such as zirconium (Zr) and tungsten (W), as well as nontransition metals and other materials, such as aluminum (Al). Further, certain elements such as silicon (Si) which are technically non-metals may be included as a reactive element in a brazing alloy.

As used herein "wetting" refers to the process of flowing a molten metal across at least a portion of the surface of a superabrasive particle. Wetting is often due, at least in part, to the surface tension of the molten metal, and may lead to the forming of chemical bonds between the superabrasive particle and the molten metal at the interface thereof when a reactive element is present.

As used herein, "metallurgical bond" refers to a bond between two or more metals. Such bonds may be a simple mechanical lock or bond between the metals, such as one created by the intertwining of liquid metals and the solidification thereof. Further, such bonds may be chemical in nature, such as typical ionic bonding that occurs between metals.

As used herein, "chemical bond" and "chemical bonding" may be used interchangeably, and refer to a molecular bond that exert an attractive force between atoms that is sufficiently strong to create a binary solid compound at an interface between the atoms. Chemical bonds involved in the present invention are typically carbides in the case of diamond superabrasive particles, or nitrides or borides in the case of cubic boron nitride.

As used herein, "braze alloy" and "brazing alloy" may be used interchangeably, and refer to an alloy containing a sufficient amount of a reactive element to allow the formation of chemical bonds between the alloy and a superabrasive particle. The alloy may be either a solid or liquid solution of a metal carrier solvent having a reactive element solute therein. Moreover, "brazed" may be used to refer to the formation of chemical bonds between a superabrasive particle and a braze alloy.

As used herein, "coat," "coating," and "coated," with respect to a superabrasive grit or particle, refers to an area along at least a portion of an outer surface of the particle that has been intimately contacted with a reactive metal, or reactive metal alloy, and that contains chemical bonds between the particle and the alloy, or that will contain such chemical bonds upon the liquification and solidification of the reactive metal, or reactive metal alloy. In some aspects, the coating may be a layer which substantially encases or encloses the entire superabrasive particle. It is to be understood that such layers are limited in some instances to a certain minimum thickness. Further, it is to be understood that such a coating may be applied to particles on an individual basis, or as a group of particles, and that such a coating may be effected as a separate step made prior to incorporation of the superabrasive particles into a tool, for example, in order to form a tool precursor which can be combined with a support matrix to form certain tools. Moreover, it is possible that a number of coated particles be consolidated together either with or without additional abrasive particles and used as a tool in and of themselves, without the need for incorporation into a support matrix.

As used herein, "separator" refers to any form of a material that is capable of separating superabrasive particles during the process of coating such superabrasive particles with a molten braze alloy. In one aspect, the separator may be thermally resistant powder that has no affinity to chemically react with the molten braze alloy. In another aspect, the separator may be a sheet, tray, or other forms with a plurality of apertures for separating the particles.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 micrometer to about 5 micrometers" should be interpreted to include not only the explicitly recited values of about 1 micrometer to about 5 micrometers, but also include individual values and sub ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

INVENTION

The present invention encompasses superabrasive tools having improved superabrasive particle retention, as well as various components thereof, such as a coated superabrasive grit, and tool precursors. Additionally, the present invention encompasses various methods for the fabrication of such tools and components. In one aspect, the present invention provides a coated superabrasive particle that includes a superabrasive particle, and a solidified coating of a molten braze alloy which is chemically bonded to the superabrasive particle.

The superabrasive particles used may be selected from a variety of specific types of diamond (e.g., polycrystalline diamond) and cubic boron nitride (e.g., polycrystalline cBN), and are capable of chemically bonding with a reactive material. Further, such particles may take a number of different shapes as required to accommodate a specific purpose for the tool into which it is anticipated that they will be incorporated. However, in one aspect, the superabrasive particle may be diamond, including natural diamond, synthetic diamond, and polycrystalline diamond (PCD). In yet another aspect, the superabrasive particle may be cubic boron nitride (cBN), either single crystals or polycrystalline. In yet another aspect, the superabrasive particle may be a member selected from the group consisting of SiC, $Al_2O_3$, Zr $O_2$, and WC.

Additionally, a number of reactive elements may be used in the metal alloy in order to achieve the desired chemical bonding with the superabrasive. A wide variety of reactive elements that can be alloyed with a metallic carrier is known to those skilled in the art, and the selection of a particular reactive element may depend on various factors. Examples of suitable reactive elements for inclusion in the braze alloy used in the present invention include without limitation, members selected from the group consisting of: aluminum (Al), boron (B), chromium (Cr), lithium (Li), magnesium (Mg), molybdenum (Mo), manganese (Mn), nirobium (Nb), silicon (Si), tantalum (Ta), titanium (Ti), vanadium (V), tungsten (W), zirconium (Zr), and mixtures thereof. In addition to the reactive element or elements, the braze alloy used to form the coating in accordance with the present invention includes at least one other metal as a carrier or solvent. Any metal recognized by one of ordinary skill in the art may be used as such a carrier or solvent, especially those known for use in making superabrasive tools. However, by way of example, without limitation, in one aspect of the present invention, such metals may include, Co, Cu, Fe, Ni, and alloys thereof.

As alluded to above, one goal of alloying a reactive element with another metal is to reduce the effective melting point of the reactive element, while maintaining its ability to chemically bond with a superabrasive particle. As is known in the art, the thermal stability limit of many superabrasive materials, such as diamond, ranges from about 900° C. to about 1200° C. As such, in one aspect of the invention, the components and exact ratios of the reactive metal alloy may be selected to provide an alloy that has a melting point within or below the thermal stability limit of the particular superabrasive material being used. In practice, a solvent metal may be selected and combined with a reactive element in proper amounts to reduce the melting temperature of both elements and yield a braze alloy having a melting temperature of less than about 1200° C. In yet another aspect, the melting temperature may be below about 900° C.

As will be recognized by those of ordinary skill in the art, numerous combinations of specific reactive metals and other specific carrier metals may be alloyed in different ratios or amounts to achieve an alloy that chemically bonds to the superabrasive particle, and has a suitable melting point. However, in one aspect, the content of the reactive element may be at least about 1% of the alloy. In another aspect, the amount of element may be at least about 5% of the alloy.

Notably, the improved retention aspects of the coated abrasive particles of the present invention are due in large measure to the amount of chemical bonding that is achieved between the coating and the superabrasive particle. The absence or nominal presence of such chemical bonding is a primary cause of premature grit pullout in tools employing known methods, such as electroplating and sintering.

One advantage presented by the method of the present invention is the ability to vary or control the thickness of the reactive metal alloy coating around the superabrasive particle. Such an ability is enabled by the molten liquid state in which the alloy is applied, as will be discussed in further detail below. Specific thicknesses may be selected by one of ordinary skill in the art, as required to accomplish a particular purpose. However, in one aspect of the invention, the coating may have a thickness of at least about 1 micrometer. In another aspect, the coating may have a thickness of at least about 50 micrometers.

The particle coating may be accomplished in a single layer, or by the production of multiple layers. In one aspect, the reactive metal may be provided as an undercoat that is applied via gaseous vapor deposition techniques as are known to those of ordinary skill in the art, and as more fully described below. The molten metal can then be provided as either a pure metal substance which alloys with the reactive metal upon molten application thereof to the superabrasive particle, or may be an alloy containing yet additional reactive metal. In either case, the alloy can form the desired chemical bonds with the superabrasive grit. In another aspect of the invention, the coating may further include at least one metallic overcoat layer that is bonded to an outside portion of the solidified braze alloy coating. A number of materials may be used for such a metallic overcoat, as will be recognized by those of ordinary skill in the art, and specific selection may be based on a number of factors, including the main matrix material and design of the tool into which the coated particle is to be incorporated. However, in one aspect, the metallic overcoat may include at least one metal selected from the group consisting of Co, Cu, Fe, Ni, and mixtures thereof. As will be recognized, one or more overcoats may be utilized to achieve a desired total coating thickness for the coated particle. In one aspect, the total coating thickness achieved around the superabrasive particle may be greater than the diameter of the superabrasive particle.

In addition to the metallic overcoat, a number of various other materials may be applied as an overcoat on the solidified braze alloy coating. Referring to FIGS. 1a-1c, there are shown various embodiments of superabrasive particles 10 coated with a solidified liquid braze coating 15 in accordance with the present invention. As can be seen, FIG. 1c additionally shows the bonding of smaller particles 20 to the exterior of the coating. In some aspects, such particles may be materials of various constitution, with the proviso that such particulates each have a size that is smaller than the coated superabrasive particle. Examples of specific types include without limitation, metallic particulates, metallic alloy particulates, such as carbides, or superabrasive particulates. Examples of specific carbide particulates include without limitation, SiC, WC, and Ti coated cBN. In one aspect, such particles may be diamonds or other superabrasive particles that have a smaller size than the coated superabrasive particle. Such coatings have been found to further increase the retention strength of the superabrasive particle. Specifically, coatings of these types effect a gradual or "gradient" transition between the outside of the reactive metal alloy coating, and the matrix material of the tool into which the coated superabrasive particle is incorporated. Thus, the weak interface created by a sharper transition between two materials is eliminated.

In one aspect of the present invention, the molten braze alloy may wet at least about 40% of the surface of the superabrasive particle. In another aspect, the alloy may wet at least about 50% of the surface of the superabrasive particle. In yet another aspect, the alloy may wet at least about 60% of the surface of the superabrasive particle. In some aspects, at least about 80% or greater of the surface of the superabrasive particle may be wetted by the braze alloy.

Figure 2:
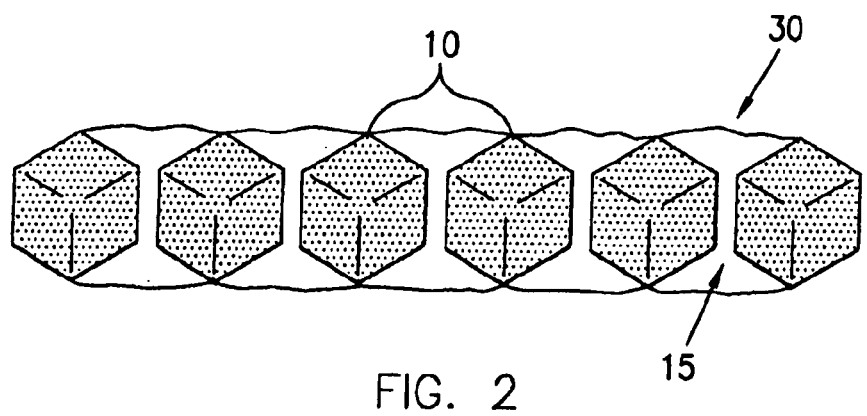
FIG. 2 is a side view of a tool precursor in accordance with one embodiment of the present invention.
Figure 3:
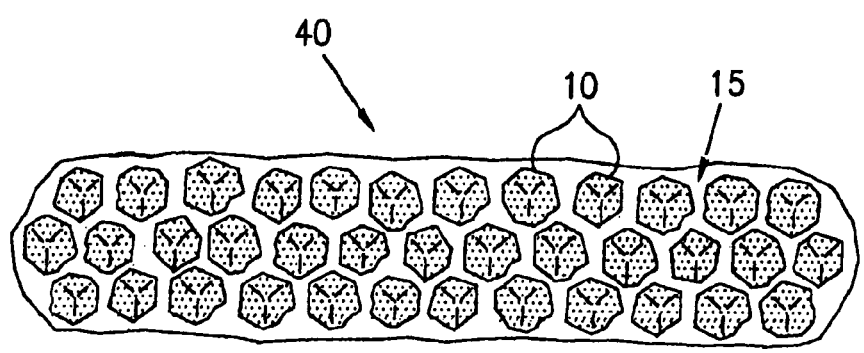
FIG. 3 is a side view of a tool precursor in accordance with another embodiment of the present invention.

It should be noted that a single molten braze coated particle can act as a told precursor for incorporation into a tool. Further, in accordance with the present invention, a plurality of coated particles may be metallurgically bonded together into various one, two, and three dimensional configurations and used as tool precursors. In some aspects, the tool precursors may consist essentially of the superabrasive particles and the solidified molten braze alloy. For example, referring now to FIG. 2, there is shown one embodiment of a one dimensional tool precursor 30 in accordance with the present invention. The tool precursor includes a plurality of superabrasive particles 10, each coated with, and metallurgically bonded together, by superabrasive coatings 15. The superabrasive particles are aligned in a single row forming a one dimensional needle-type structure. Further, FIG. 3 shows a two dimensional tool precursor 40 that is made by metallurgically bonding a plurality of one dimensional structures as shown in FIG. 2 together. In yet another embodiment of the present invention, a plurality of two dimensional tool precursors, such as plates, sticks, or rods, such as shown in FIG. 2, can be metallurgically bonded together to form a three dimensional structure (not shown). It should be noted that while the particles of the tool precursors shown in FIGS. 2 and 3 are arranged in accordance with a predetermined pattern, in some aspects, the particle positioning may be random.

The present invention additionally encompasses various methods of making and using superabrasive tools, including various components thereof such as the coated superabrasive particles and tool precursors as described herein. Such methods may employ the materials, structures, dimensions, and other parameters disclosed for the device above, as well as equivalents thereof as recognized by one of ordinary skill in the art. In one aspect, the present invention includes a method of chemically bonding a superabrasive particle to a reactive metal alloy coating. Such a method may include the steps of covering the superabrasive particle with the braze alloy in a molten liquid state and solidifying the liquid braze alloy around the superabrasive particle, such that the reactive metal alloy becomes chemically bonded with the superabrasive particle.

Those of ordinary skill in the art will recognize a number of ways to cover the superabrasive particle with the molten braze alloy, such as by dipping the particles in the alloy, and dripping the alloy onto the particles, among other application techniques. However, in one aspect of the invention, the step of covering may further include the steps of: (a) coating the superabrasive particle with an organic binder material, (b) adhering a powdered form of braze alloy to the superabrasive particle with the organic binder material, and (c) heating the reactive metal alloy to a temperature sufficient to cause the alloy to melt and coat and chemically bond to the superabrasive particle.

A variety of organic binders will be recognized as suitable for use in this context by those of ordinary skill in the art. However, in one aspect, the binder material may be a member selected from the group consisting of: polyvinyl alcohol (PVA), polyvinyl butyral (PVB), polyethylene glycol (PEG), paraffin, phenolic resin, wax emulsions, and acrylic resins. In another aspect, the binder may be PEG. Further, applying the powdered form of the reactive metal alloy to the binder coated particle for the purposes of adhering the alloy thereto may be accomplished by various methods, such as rolling, dipping, or tumbling the binder coated particles with the powder. Further, such application may be accomplished by various methods of spraying, showering, projecting, or otherwise directing the powder onto the superabrasive particles to form the desired coating. One example of such a method is by the use of a fluidized bed stream. Other methods of adhering the powder to the binder coated particles will be recognized by those of ordinary skill in the art.

A variety of ways for heating the powder coated superabrasive particles may be employed as recognized by those of ordinary skill in the art. No particular limitation is placed on the specific heating mechanism employed, other than the ability to reach a temperature sufficient to melt the powdered braze alloy into a molten liquid state. Once melted, the liquid alloy will wet the superabrasive particles and form the desired chemical bonds at the interface thereof. Further, other mechanisms in addition to heat may be used to facilitate the melting and liquefaction of the alloy, such as by adding a flux, or other methods as will be recognized by those of ordinary skill in the art, so long as such methods do not hinder or prevent the wetting of the superabrasive particles and the formation of the desired chemical bonds.

Under some circumstances, it may be desirable to first coat or "pretreat" the superabrasive particle with certain materials, prior to covering it with the molten braze alloy. Such undercoating materials may be used with any superabrasive particle, but are especially advantageous with certain superabrasive particles, such as cBN, which are extremely inert. The high inertness of such materials may make it difficult to create chemical bonds with the molten braze alloy. Therefore, in one aspect of the present invention, the superabrasive particle may be conditioned by forming a pretreatment, or undercoating layer of a reactive material on the superabrasive particle. Such undercoating layers may typically be formed by conventional methods, such as the solid state and vapor deposition techniques discussed above. In one aspect, the pretreatment layer may be a reactive material selected from the group consisting of: Cr, Si, Ti, and W. In another aspect, the pre-treatment material may be Ti. Those of ordinary skill in the art will recognize other suitable materials that may be first deposited on the superabrasive particle, including materials formed in multiple layers, in order to facilitate or enhance the formation of chemical bonding with the molten braze alloy.

As a practical matter, it may often be the case that a plurality of superabrasive particles are simultaneously coated with the molten braze alloy in a single processing event. In such instances, according to certain aspects of the present intention, it may be desirable to prevent coated particles from fusing or joining together. As such, in one aspect, the heating step of the present method may include the steps of: (a) distributing the superabrasive particles in a separator that allows separation of the particles during heating, (b) heating the reactive metal alloy to a temperature sufficient to cause the alloy to melt and wet and chemically bond to the superabrasive particle, and (c) removing the superabrasive particles from the separator. A variety of separating methods and devices may be employed. The specific selection of a particular separator may be dictated by factors such as speed, economy, and quality of result achieved. However, in one aspect, the separator may be a powder which does not react with the braze alloy, and which can tolerate high temperatures. Examples of such materials include without limitation, oxide powders, such as $Al_2O_3$, $SiO_2$, or $ZrO_2$, and nitride powders, such as BN, AlN. Other non-reactive powdered materials will be recognized by those of ordinary skill in the art.

In another aspect, the separator may be a plate with a plurality of apertures therein. The specific size and placement of the apertures may be determined in part by the size and shape of the superabrasive grit being coated. However, as a general procedure, a single superabrasive grit may be placed in each aperture of the plate, in either a coated, or uncoated state. Excess grits are swept off the plate, and the apertures are then filled with braze powder. The plate containing the grits and braze alloy is then subjected to a sufficient amount of heat to melt the braze alloy and cause the wetting of the grits and the formation of chemical bonds. In the case where grits have not been pre-coated prior to deposition in the apertures, powdered coating may then be placed in, or over, the aperture, and will cover and attach to the superabrasive particle when melted by a sufficient amount of heat.

After the melted braze alloy has bonded to the superabrasive particles, the particles are allowed to cool, and the braze alloy solidifies. Once the alloy has solidified, the coated superabrasive particles are removed from the separator and may be either subjected to additional processing steps as alluded to above, such as by applying one or more overcoats, or by bonding additional smaller particles thereto. Alternatively, the coated superabrasive particles may be directly incorporated into a tool by coupling the particles to a tool body, for example, by impregnating the coated grits into a matrix, or in some aspects, by simply coupling a plurality of particles together.

Alternatively, in some aspects of the invention it may be desirable to have the superabrasive particles coated simultaneously in a manner that also allows them to metallurgically bond together in the same step. For example, when a one, two, or three dimensional tool precursor is desired, it may be convenient to simply arrange the particles in the desired configuration, for example, by placing the particles into a tray with a specified shape, or by individual placement of the particles as recited above, and then coat the particles en mass with the molten braze alloy. Upon solidification of the alloy, the particles not only become chemically bonded thereto, but the coatings of the particles become metallurgically bonded to one another. In one aspect, the braze material may be provided as a powder. In another aspect, the braze material may be provided as a sheet or foil of amorphous brazing alloy.

Once the coated superabrasive particle or tool precursor is complete, it may be incorporated into a tool by metallurgically bonding the particle or precursor to a support matrix. A number of tools may find use for such coated superabrasive particles, including without limitation, saw blades, drill bits, grinding wheels, and chemical mechanical polishing pad dressers, among others. A number of ways of incorporating the coated particle into such tools will be recognized by one of ordinary skill in the art, and the specific method of integration may be determined by a number of factors, such as the other materials in the tool, tool configuration, tool purpose, type of support matrix, etc.

Moreover, the arrangement of such particles may be in accordance with a predetermined pattern or specific configuration. Examples of specific methods of effecting such patterns or configurations of superabrasive particles may be found in U.S. Pat. Nos. 4,925,457, 5,380,390, 6,039,641, and 6,286,498, each of which is incorporated herein by reference. Additionally, in many cases, the tool precursors themselves may be suitable for certain uses as a tool. Moreover, a number of uses for individually coated particles not incorporated into a tool will be recognized by those of ordinary skill in the art as loose abrasives.

Those of ordinary skill in the art will readily recognize a number of ways of creating specifically desired configurations, such as by using a mold, etc. Once in a mold, additional brazing or metal particulate material may be added to the assembly in order to add substance to the forming body. Additionally, superabrasive particles of different sizes may be assembled in order to reduce the amount of interstitial spaces between particles, and provide a rigid and durable polycrystalline body. Other techniques of reducing interstitial space may also be applied to the diamond agglomerate while in a mold, such as shaking, vibrating, etc, if desired.

The consolidated coated diamond particles may additionally be infiltrated with a number of specific materials aimed at attaining a specific purpose. For example, molten Si may be infiltrated through the diamond agglomerate during the formation of the diamond body in order to create a tool capable of dissipating heat, such as a heat spreader. A number of other specific tools that can be created using the present technology will be recognized by those of ordinary skill in the art, such as drill bits, saws, and other cutting tools.

When used, the support matrix, to which the coated particles and tool precursors are bonded, may be selected from a wide variety of materials that will be recognized by those of ordinary skill in the art. Metal powders which can be consolidated, and solid metal substrates are exemplary.

Figure 4:
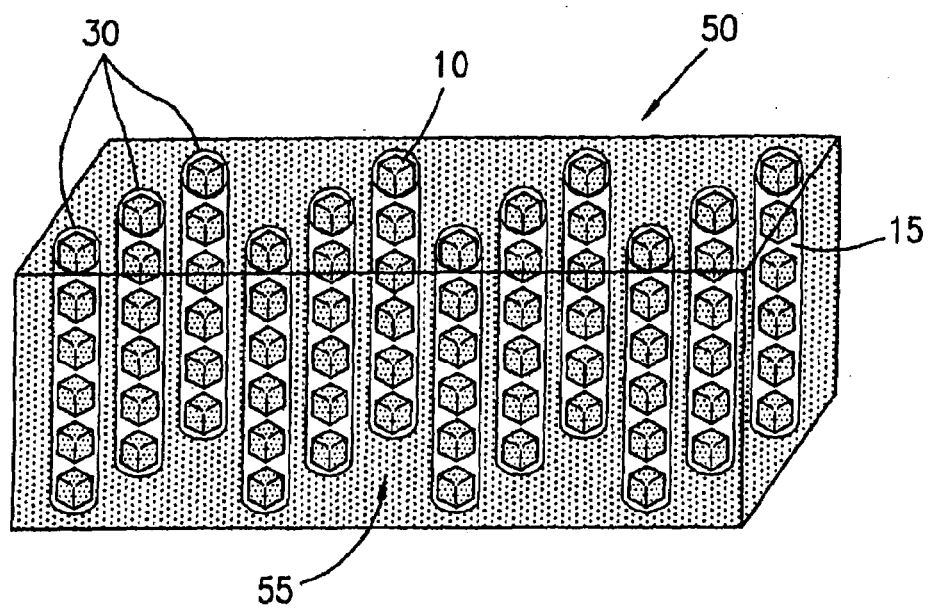
FIG. 4 is a perspective view of a superabrasive tool having a plurality of precursors metallurgically bonded thereto such that the superabrasive particles are arranged according to a predetermined pattern in accordance with one embodiment of the present invention.

Referring now to FIG. 4, there is shown a perspective view of one embodiment of a superabrasive tool 50 in accordance with the present invention The tool has a support matrix 55 of consolidated metal powder, and a plurality of one dimensional tool precursors 30 each having a plurality of superabrasive particles 10 bonded by a solidified braze coating 15 which is further metallurgically bonded to the support matrix. As can be seen, the tool precursors have been arranged in the matrix support materiel such that the superabrasive particles are each held as specific locations in accordance with a predetermined pattern. However, it is to be noted that such patterns while desirable are optional. For example, as shown in FIG. 5, superabrasive particles 10 coated with solidified molten braze alloy 15 are held randomly in the support matrix 55.

Additionally, while the matrix support material in FIG. 4 is shown as a consolidated powder, it is to be understood that the present invention may alternatively utilize a solid metal support matrix. In such a case, the support matrix would be configured with slots or grooves that can accommodate the tool precursors, or a plurality of coated particles. Further, for some tools with a solid metal support matrix, it maybe desirable to simply bond the abrasive particles to the surface of the matrix, as will be discussed in greater detail below.

Figure 5:
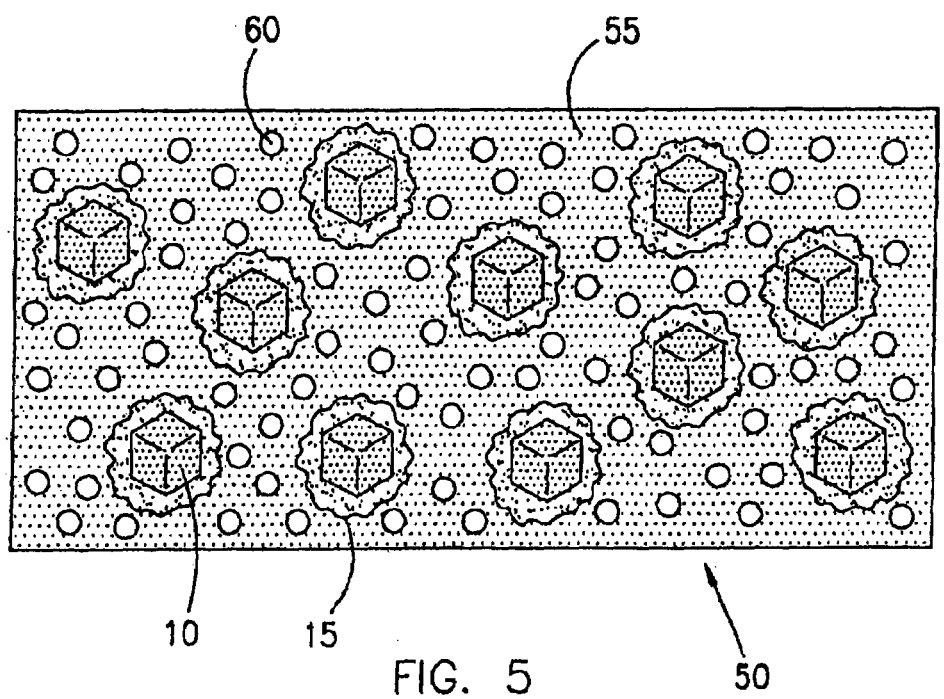
FIG. 5 is a sectional view of a superabrasive tool having a plurality of coated superabrasive particles randomly placed in a porous support matrix.

Referring to FIG. 5, there is shown yet another embodiment of a superabrasive tool 50 in accordance with the present invention. Most notably, the support matrix 55 is porous, containing a plurality of pores 60. It has been discovered that such pores are advantageous for the purposes of improving tool performance, especially when the tool is one utilized for the purpose of material removal. Specifically, the pores and spacers may facilitate the chipping and breaking of material from the workpiece. Further, the pores may act as a conduit for passing and holding a liquid coolant. In this manner, the tool may remove material from the workpiece at a faster rate without a significant increase in temperature. Such pores may be implemented into a tool in a variety of manners. For example, air may be bubbled through a powdered matrix material during the consolidation thereof, grains that disintegrate during the heating step may be used, or the pores may result to some degree simply from the consolidation processing procedure, such as sintering. Further, in some aspects, the pores may result from placement and joining of the coated superabrasive particles, and may occur in accordance with a predetermined pattern.

One reason why a porous support matrix is feasible is because of the fact that the superabrasive particles are chemically bonded with the brazing alloy and thus tenaciously held in the matrix. As a result, a reduced amount of mechanical support for each particle is acceptable. Moreover, the chemical bonding allows for softer, less expensive materials to be used as the matrix support, such as Cu, Fe, steel, etc.

In addition to metallurgically bonding the coated superabrasive particles to a support matrix, in some aspects, the coated particles may be attached to the matrix with an adhesive or organometallic binder. As discussed in Applicant's U.S. patent application No. 10/627,446, filed on Jul. 25, 2003, now issued as U.S. Pat. No. 6,915,796, which is incorporated herein by reference, a wide variety of organic and organometallic binders are known to those of ordinary skill in the art and may be used. Organometallic coupling agents can include at least one reactive moiety which chemically reacts with metal to form a chemical bond and at least one reactive moiety which reacts with the organic binder to form a chemical bond. In this way, the organometallic coupling agent acts as a bridge to form bonds between the organic binder and the metal surface of the coated superabrasive particles. In one aspect of the present invention, the organometallic coupling agent can be a titanate, zirconate, silane, or mixture thereof. These materials can contain hydrolyzable groups which react with hydroxyl groups on the uncovered areas of the metallic particles, and thereby chemically bond to the metal surface. Additionally, these materials can also contain non-hydrolyzable groups which chemically react with the organic binder. Such organometallic coupling agents are described in U.S. Pat. Nos. 4,620,933, 5,558,705, 5,571,296, and 6,579,931, which are each incorporated by reference.

Specific non-limiting examples of silanes suitable for use in the present invention include: 3-glycidoxypropyltrimethoxy silane (available from Dow Corning as Z6040); γ-methacryloxy propyltrimethoxy silane (available from Union Carbide Chemicals Company as A-174); β-(3,4-epoxycyclohexyl)ethyltrimethoxy silane, γ-aminopropyltriethoxy silane, N-(β-aminoethyl)-γ-aminopropylmethyldimethoxy silane (available from Union Carbide, Shinetsu Kagaku Kogyo K.K., etc.); and additional examples of suitable silane coupling agents can be found in U.S. Pat. Nos. 4,795,678, 4,390,647, and 5,038,555, which are each incorporated herein by reference.

Specific non-limiting examples of titanate coupling agents include: isopropyltriisostearoyl titanate, di(cumylphenylate)oxyacetate titanate, 4-aminobenzenesulfonyldodecylbenzenesulfonyl titanate, tetraoctylbis (ditridecylphosphite) titanate, isopropyltri(N-ethylaminoethylamino) titanate (available from Kenrich Petrochemicals. Inc.), neoalkyoxy titanates such as LICA-01, LICA-09, LICA-28, LICA-44 and LICA-97 (also available from Kenrich), and the like.

Specific non-limiting examples of aluminum coupling agents include acetoalkoxy aluminum diisopropylate (available from Ajinomoto K.K.), and the like.

Specific non-limiting examples of zirconate coupling agents include: neoalkoxy zirconates, LZ-01, LZ-09, LZ-12, LZ-38, LZ-44, LZ-97 (all available from Kenrich Petrochemicals, Inc.), and the like. Other known organometallic coupling agents, e.g, thiolate based compounds, can be used in the present invention and are considered within the scope of the present invention.

The amount of organometallic coupling agent used depends on the coupling agent and on the surface area of the metallic particles coating the superabrasive particles. Typically, 0.05% to 10% by weight of the organic binder layer is sufficient. The organometallic coupling agent can also improve bonding between the organic binder layer and the metal wire, as well as bonding with the coated superabrasive particles.

Figure 6:
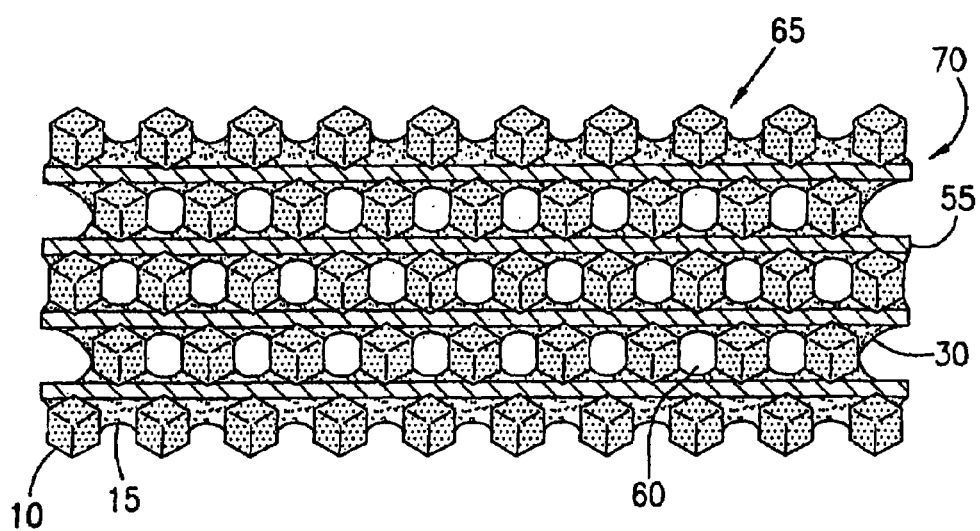
FIG. 6 is a front end view of a superabrasive tool having a plurality of diamond and substrate layers bonded together in accordance with one embodiment of the present invention.

As noted above, the methods of the present invention may be used in the production of a wide variety of superabrasive tools. Referring now to FIG. 6, there is shown a saw segment for use in a saw, such as a reciprocating or circular saw. The saw segment 65 has a plurality of stacked and metallurgically bonded layers 70 of support matrix 55 and tool precursors 30. The tool precursor is metallurgically bonded to one or more support matrix to form a layer, and the layers are effectively metallurgically bonded together. Additionally, because of the spacing of the superabrasive particles 10 within each layer, and because of the amount and application of the brazing alloy 15, a plurality of pores 60 occur. Again, these pores may provide all of the advantages as recited above.

In the embodiment shown in FIG. 6, the brazing alloy 15 utilized to make the tool precursors 30 is a sheet or foil of amorphous brazing alloy. However, it is to be noted that another form of brazing alloy, such as a powdered form may be used. In one aspect of fabrication, sheets may be adhered to each side of a support matrix 55, and then the superabrasive particles 10 adhered to the exposed surface of one or both sheets to form a layer. Notably, the superabrasive particles may be adhered either randomly, or in accordance with a predetermined pattern. Multiple layers are then assembled by stacking and heated to a temperature sufficient to melt the sheets of brazing alloy and coat the superabrasive particles. The assembly is then cooled and the brazing alloy solidifies and chemically bonds to the particles, and metallurgically bonds to the support matrices, effectively bonding the layers together. The saw segment may then be attached to the blade of a saw.

Figure 7:
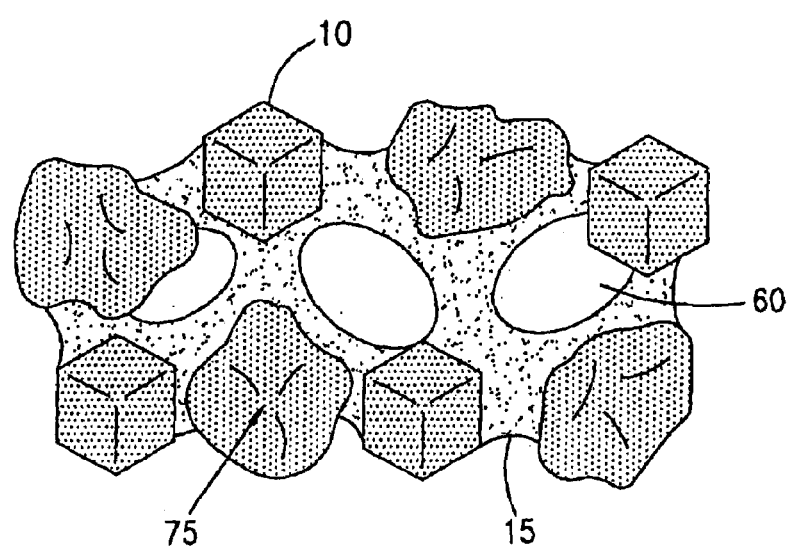
FIG. 7 is a sectional view of a superabrasive tool having a plurality of braze coated diamond particles metallurgically bonded together, along with a plurality of spacer particles chemically bonded to the braze alloy, and having pores in the alloy in accordance with one embodiment of the present invention.

As an alternative to being bonded to a matrix support, the coated particles of the present invention may include a plurality of spacer particles which are mixed with and become chemically bonded to the brazing alloy. Referring now to FIG. 7, there is shown a sectional of a tool made in accordance with another embodiment of the present invention. As can be seen, a plurality of superabrasive particles 10 coated with a solidified molten braze alloy 15 are metallurgically bonded together into a porous tool containing pores 60. Additionally, the tool contains a plurality of spacer particles 75 which are chemically bonded to the brazing alloy. The spacer particles may themselves be coated with a solidified molten braze alloy prior to incorporation into the tool, or may be uncoated. It is also to be understood that while the superabrasive and spacer particles are depicted in FIG. 7 in a random placement, that the placement thereof may be in accordance with a predetermined pattern, and the pores may also occur in accordance with a predetermined pattern. Those of ordinary skill in the art will recognize a number of suitable materials for the spacer particles, and the specific selection of a material may be based on a number of considerations, such as the type of tool, brazing alloy, etc. However, in one aspect, the material may be SiC.

The following examples present various methods for making the coated superabrasive particles of the present invention. Such examples are illustrative only, and no limitation on present invention is meant thereby.

EXAMPLES

Example 1

Diamond grits of 40/50 mesh were covered with a thin film of an acrylic binder. The binder covered diamond was then mixed with a powdered metallic alloy containing B, Ni, Cr, Si, having an average particle size of about 325 mesh, and sold under the trade name NICHROBRAZ LM® (Wall Colomnoy). The result was a braze powder wrapped diamond. These coated grits were then mixed with fine powder of $Al_2O_3$. The mixture was heated in a vacuum furnace held at $10^{-5}$ torr to a maximum temperature of about 1005° C. for approximately 17 minutes to assure that the metallic alloy coating became molten and liquefied and flowed around the diamond particles wetting them. The mixture was then cooled and retrieved from the furnace. After separating the diamond particles from $Al_2O_3$, a number of coated particles were mixed with a cobalt powder and sintered in a hot press to form rectangular segments. Some of these segments were broken by bending with pliers. The fractured surface was then viewed under a microscope. It was observed that the fracture plane propagated through the coated diamond particles rather than deviating around the interface between the diamond particle and the coating, as is typical of sintered diamond particles without the braze coating described above.

Example 2

The same procedure as outlined in Example 1 was followed, but the $Al_2O_3$ separator powder was replaced with diamond particles having an average mesh size of from about 325 to about 400 mesh. During the heating process, the smaller diamond particles were wetted by the braze alloy coating, and became chemically bonded to the outside of the coated diamond particle. Thus, coated diamond particles having a chemically bonded metallic alloy shell with smaller diamond particles further bonded to the outside of the shell were produced. These "spiky" coated particles were incorporated into a cobalt matrix and fracture tested as above with similar results achieved.

Example 3

The process of Example 2 was followed, but the smaller diamond particles were replaced with particles of SiC. The process yielded a coated diamond particle having ceramic particles bonded to the outside of the metallic coating similar to the diamond particles of Example 2. Moreover, the fracture testing yielded results similar to that of Examples 1 and 2.

Example 4

Diamond particles were coated with a powdered braze alloy as in Example 1, and then lined up in a groove carved on an $Al_2O_3$ plate. A small amount of braze powder was packed in between the coated particles, and the assembly was heated in a furnace as in Example 1. The resultant "needle" was fracture tested as in the previous examples, and revealed fracture across a diamond grit, rather than fracture around the diamond grit at the interface of the diamond and the metal alloy coating, or between diamond particles.

Example 5

The same procedure was followed as in Example 4, however, diamond coated particles were spread out on the $Al_2O_3$ plate. Braze powder was then packed between the coated particles and the assembly was heated as in the previous examples. The resultant diamond plate of diamond grit bonded by brazing alloy was then fracture tested as in previous examples. Analysis of the fracture plains revealed random fractures that included fractures through various diamond particles, rather than a pattern of fractures following the diamond particle arrangement and falling primarily at the diamond particle/metallic coating interfaces.

Example 6

The procedure of Examples 4 and 5 was again followed, only the interstices between coated diamond particles were filled with a mixture of WC and the braze powder used to coat the diamond particles. Heating in accordance with the prior examples was again conducted, and a tile of the composite materials was obtained. The tile was fracture tested, and the results proved to be consistent with those obtained for the above-recited examples.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of making a tool precursor consisting essentially of:
   providing a plurality of superabrasive particles;
   coating each superabrasive particle with a molten braze alloy; and
   metallurgically bonding together the plurality of superabrasive particles with the braze alloy via solidification of the molten braze alloy to form the tool precursor.

2. The method of claim 1, wherein each particle is coated with the molten braze alloy prior to metallurgically bonding the particles together.

3. The method of claim 1, wherein each particle is coated with the molten braze alloy simultaneously with metallurgically bonding the particles together.

4. The method of claim 1, wherein the particles are arranged in accordance with a predetermined pattern.

5. A method of making a superabrasive tool comprising:
   providing a tool precursor as recited in any one of claims 1-4; and
   metallurgically bonding the tool precursor to a support matrix.

6. The method of claim 5, further comprising providing a plurality of tool precursors prior to metallurgically bonding to a support matrix.

7. The method of claim 6, further comprising arranging the tool precursors such that the superabrasive particles are disposed in accordance with a predetermined pattern, prior to metallurgically bonding the precursors to the support matrix.

8. The method of claim 5, wherein the support matrix and tool precursor form a layer.

9. The method of claim 8, further comprising metallurgically bonding a plurality of layers together.

* * * * *